United States Patent [19]

Yamada et al.

[11] 4,068,285
[45] Jan. 10, 1978

[54] VARIABLE CAPACITOR

[75] Inventors: Kuniharu Yamada, Suwa; Yukio Morozumi, Chino; Keiichi Iuchi, Okaya, all of Japan

[73] Assignee: Kabushiki Kaisha Suwa Seikosha, Tokyo, Japan

[21] Appl. No.: 683,456

[22] Filed: May 5, 1976

Related U.S. Application Data

[63] Continuation-in-part of Ser. No. 501,387, Aug. 28, 1974, abandoned.

[30] Foreign Application Priority Data

Aug. 28, 1973  Japan .................................. 48-96456

[51] Int. Cl.$^2$ ............................................. H01G 5/06
[52] U.S. Cl. ...................... 361/293; 361/292
[58] Field of Search .................. 317/249 R, 249 D; 361/293, 292

[56] References Cited

U.S. PATENT DOCUMENTS

| | | | |
|---|---|---|---|
| 3,244,951 | 4/1966 | Wallace | 317/249 D |
| 3,883,937 | 5/1975 | Alexander | 317/249 D |

FOREIGN PATENT DOCUMENTS

| | | | |
|---|---|---|---|
| 536,831 | 2/1957 | Canada | 317/249 D |
| 764,965 | 1/1945 | Germany | 317/249 D |
| 807,382 | 6/1957 | United Kingdom | 317/249 D |

Primary Examiner—E. A. Goldberg
Attorney, Agent, or Firm—Blum, Moscovitz, Friedman & Kaplan

[57] ABSTRACT

A variable capacitor is provided wherein a reinforcing plate is utilized in the rotor assembly in order to increase the range of the capacitor. The capacitor includes the stator plate and first electrode, the stator plate supporting a lead pin and a rotor positioning member, the rotor positioning member being rotatably mounted thereon. The rotor positioning member rotatably supports a uniformly thick rotor assembly in rotatable friction contact with the stator plate and first electrode. The rotor assembly includes a dielectric, a second capacitor electrode and a reinforcing plate, the thickness of the dielectric determining the minimum value of capacitance of the variable capacitor. The rotor assembly also includes a fixed spring secured to the positioning member, the lead pin and fixed spring being adapted to facilitate use of variable capacitor in small-size electronic instrumentation.

10 Claims, 6 Drawing Figures

VARIABLE CAPACITOR

CROSS-REFERENCE TO RELATED APPLICATIONS

This application is a continuation-in-part application based on parent application Ser. No. 501,387, filed on Aug. 28, 1974, now abandoned.

BACKGROUND OF THE INVENTION

This invention is directed to variable capacitors, and in particular, to variable capacitors particularly suitable for use in electronic instruments requiring the capacitor to be small-sized yet admit of a large range of capacitance. In small-sized electronic instruments such as a quartz crystal wristwatch, three characteristics thereof are required in order to utilize same. The first and second characteristics, namely providing for minimum amounts of capacitance yet enabling the variable capacitor to be set over a wide range of capacitances are mutually exclusive characteristics and accordingly are difficult to obtain in a single variable capacitor. Finally, because the space allowed for a variable capacitor in a quartz crystal wristwatch is very small, the third characteristic, namely, small and uniform size, must be obtained. Heretofore, reduction in the thickness of the rotors' dielectric has been limited, such minimum thickness being required for reducing the minimum capacitance of such a variable capacitor. Also, the inability to maintain a capacitor of uniform thickness renders same less suitable for interchangeability. Finally, the thinning of the rotor dielectric causes the dielectric to crack and break due to the friction contact that the rotor dielectric maintains with the fixed stator electrode. Accordingly, it is desired to provide a capacitor having a uniform thickness, wherein the variable capacitor can provide a wide range of capacitance and particularly in the minimum capacitance ranges heretofore unavailable in such small-sized variable capacitors.

SUMMARY OF THE INVENTION

Generally speaking, in accordance with the invention, a variable capacitor having a rotor assembly including a reinforcing plate is provided. The variable capacitor includes a fixed stator supporting plate supporting a fixed stator electrode, and a positioning member rotably mounted to the stator plate. The positioning member supports a rotor assembly of uniform thickness for rotation therewith in friction contact with said fixed stator plate and fixed electrode. The rotor assembly includes a dielectric, a rotor electrode and a reinforcing plate, the thickness of the dielectric determining the lower limit of capacitance.

The reinforcing plate is provided with a cut-away portion formed therein. Electrically conductive curing material is coupled to the positioning member and to the rotor electrode through the cut-away portion and in contact with the portion of the reinforcing member defining the cut-away portion to structurally secure the reinforcing element, second capacitor electrode, and positioning member together so that the rotor assembly is rotated by the positioning member as a unit.

Accordingly, it is an object of this invention to provide an improved variable capacitor wherein a reinforcing plate is utilized to obtain a minimum capacitance.

Another object of this invention is to provide a reinforcing plate to enable a reduction of the thickness of the rotor dielectric to thereby reduce the minimum value of capacitance of the variable capacitor.

Still another object of this invention is to improve the strength of the rotor yet enable same to be thinner.

Still another object of this invention is to provide a uniformly thick variable capacitor having a wider range of capacitance.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
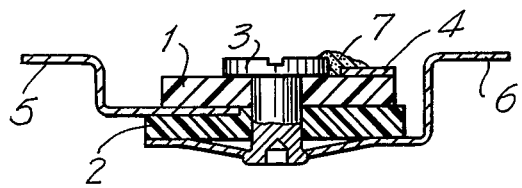
FIG. 1 is an elevated sectional view of a variable capacitor constructed in accordance with the prior art.

Reference is made to FIG. 1 wherein a variable capacitor constructed in accordance with the prior art is depicted. A fixed stator plate 2 supports a stator electrode 5 in friction contact with a rotor assembly including a rotor electrode 4 and a rotor dielectric 1. The rotor is maintained in rotatable friction contact with stator electrode 5 and stator plate 2 by a rotatable positioning member 3 and a fixed spring 6. Fixed spring 6 is conductive as is positioning member 3, and is electrically coupled through the solder to rotor electrode 4 supported on rotor 1. Solder 7 also secures the rotor assembly to the positioning member 3 for rotation therewith. In order to obtain a minimum capacitance and thereby increase the range of the variable capacitor illustrated in FIG. 1, it is necessary to reduce the thickness of the rotor dielectric 1. However, because the rotor dielectric 1 is maintained in friction contact with the stator electrode 5 and stator plate 2, the amount that the thickness of the dielectric rotor can be reduced is limited because the structural integrity of the rotor 1 must be maintained in order to keep same from crumbling because of the friction contact that is maintained between same and the stator electrode and the plate. Moreover, if the thickness of the rotor dielectric is reduced, it is then necessary to utilize a different positioning member in order to maintain the rotor dielectric in friction contact with the stator electrode and stator plate. Moreover, the thickness of the variable capacitor is changed depending on the range of variable capacitance selected, thereby rendering unpredictable the precise machine and design requirements of the small-sized instrument, in particular an electronic timepiece, utilizing same.

Figure 2:
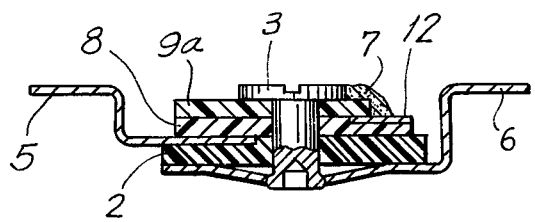
FIG. 2 is an elevated sectional view of a variable capacitor including a reinforcing plate in accordance with the instant invention.
Figure 3:
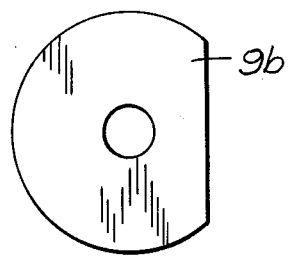
FIGS. 3, 4 and 5 are plan views of reinforcing plates particularly suited for use with the instant invention.
Figure 4:
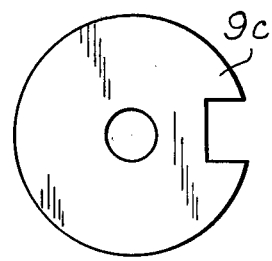
Figure 5:
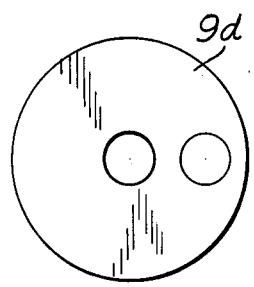

Reference is now made to FIG. 2 wherein a variable capacitor constructed in accordance with the instant invention is depicted, like reference numerals being utilized to denote like elements. The rotor assembly includes a reinforcing plate 9a mounted on the rotor dielectric 8 and rotor electrode 12. The electrode 12 can be sintered or formed in any like manner The reinforcing plate 9a is formed of a material having a high dielectric constant and includes an opening therein to provide for the passage of solder 7 connecting positioning member 3 and rotor electrode 12, so that the positioning member 3, reinforcing plate 9a, and rotor dielectric 8 rotate as a unit. It is noted that solder contacts the portion of the reinforcing plate defining the opening therein. However since the reinforcing plate has a high dielectric constant, the solder is not secured to the dielectric. Instead, the solder by contacting the portions of the reinforcing plate forming the opening therein and by fixedly securing the positioning member 3 to the rotor electrode carries the reinforcing member with the rotor electrode when the positioning member is rotated.

Reference is specifically made to FIG. 2 wherein the reinforcing plates 9b, 9c and 9d, having respectively an arc shaped cut-away region in the periphery, a peripheral notch and an aperture, which would be particularly suitable for use in the instant invention, are depicted. The positioning member 3 presses the rotor assembly into rotatable friction contact with the stator electrode 5 and stator plate 2 and further provides electric coupling of the rotor electrode 12 to the fixed spring 6. Solder 7 could be replaced by a lead wire secured by wire binding techniques, if suitable means are provided for effecting rotation of the positioning member 3, rotor electrode 12, rotor dielectric 8 and reinforcing plate 9a together. Rotor electrode 12 and the portion of stator electrode 5 in registration therewith are shaped as annular sectors to define the variable capacitor.

The thickness of the rotor assembly is maintained uniform by increasing the thickness of the reinforcing plate 9a when the thickness of the rotor dielectric 8 is reduced. The reinforcing plate 9a thereby maintains the thickness of the variable capacitor uniform and eliminates the necessity for changing the length of the rotatable positioning member 3. Moreover, the thickness of the rotor dielectric 8 can be thinned to any desired minimum capacitance value and the reinforcing plate will prevent the rotor dielectric from cracking and breaking due to the friction contact between the stator electrode and plate and the rotor dielectric. Accordingly, an improved variable capacitor wherein the rotor dielectric is reinforced by joining the reinforcing plate thereto so that the thickness of the rotor assembly is maintained uniform to effect a variable capacitor wherein the range of capacitance obtainable therefrom is increased by a lowering of the minimum capacitance is obtained.

Figure 6:
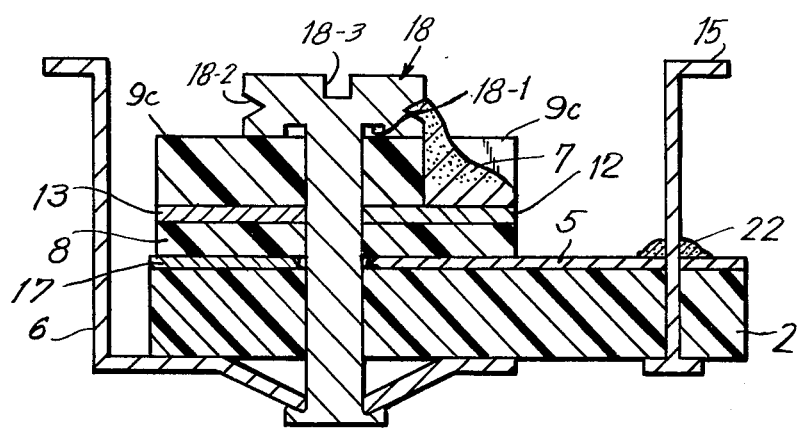
FIG. 6 is an elevated sectional view of a variable capacitor including a rotatable positioning member constructed in accordance with an alternate embodiment of the instant invention.

Reference is now made to FIG. 6 wherein a variable capacitor arrangement constructed in accordance with an alternate embodiment of the instant invention is depicted, like reference numerals being utilized to denote like elements. The rotor assembly includes a thin dielectric layer 8 having a thickness of about 0.1 mm. A conductive paste formed of palladium and/or zinc (Pd-Ag) is spread thereon, whereafter rotor electrode 12 and inactive electrode 13 are disposed thereon, after which the respective elements are sintered together to define the unitary body. The inactive rotor electrode 13 is provided in order to render the rotor assembly including the dielectric, electrode and reinforcing plate of uniform thickness throughout.

The stator assembly includes a fixed stator plate 2 for supporting an active stator electrode 5 and an inactive stator electrode 17, which electrodes are secured to the stator member 2 by a bonding agent such as the palladium and/or silver paste and the same sintering process noted above with respect to the rotor construction. The inactive electrode 17 is provided in order to provide a uniform stator surface in contact with the surface defined by the active and inactive rotor electrodes. Specifically, the inactive rotor and stator electrodes are respectively spaced (not shown) from the active rotor electrode and stator electrode in order to render the inactive electrodes electrically isolated from the active electrodes. The stator electrodes are insulated from the rotor electrodes by suitable means, such as being spaced from and out of contact with positioning member 18, to thereby insulate the stator electrodes from the rotor electrodes.

The positioning member 18 for rotationally positioning the rotor electrode with respect to the stator electrode includes a circular notch 18-1 in the bottom surface of the top portion thereof. The circular notch is provided so that the rotational forces of the positioning member on the reinforcing member are not applied at the edges of the reinforcing plate defining the opening through which the positioning member is disposed, but instead are applied at a portion of the reinforcing plate away from said opening, to thereby prevent the reinforcing member from being broken when the positioning member is rotated. The notches 18-2 on the side of the top portion of the reinforcing member are provided to receive the solder and render it unnecessary to place solder on the top surface of the positioning member and hence in the notch 18-3, which notch is necessary for effecting rotation of the positioning member about the axis thereof. Fixed spring 6 is coupled through the conductive positioning member 18 and solder 7 to the rotor electrode 12 in the same manner noted above with respect to FIG. 2 and is bent to the elevation of the positioning member 18 to provide a mounting for the variable capacitor for electrically coupling same to a circuit substrate. The stator lead terminal 15 is secured to stator support 2 and stator electrode 5 by solder 22 and extends vertically therefrom to define the other terminal of the variable capacitor. Accordingly, by forming the fixed spring 6 and lead terminal 15 in the configurations illustrated in FIG. 6, the variable capacitor can be mounted to a substrate having an opening in the substrate at the same elevation as the notch 18-3 in the positioning member 18 to permit easy access to the positioning member by appropriate means for rotating the positioning member to vary the capacitance of the variable capacitor.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A variable capacitor comprising stator means including a supporting plate, first capacitor electrode, and an adhesive means for securing said first capacitor electrode to said stator supporting plate, rotor means including a positioning member rotatably mounted on said stator plate, said positioning member rotatably supporting a rotor assembly of uniform thickness for rotation therewith in friction contact with said stator means, said rotor assembly including a dielectric layer in friction engagement with said first electrode, a second capacitor electrode, and a reinforcing plate on the side of the dielectric having an opening therein for receiving said positioning member and a second electrode spaced from the first electrode for supporting said dielectric layer, said reinforcing plate having a lower dielectric constant than said dielectric layer, and an adhesive means for securing said dielectric layer. second capacitor electrode and reinforcing plate together, and electrically conductive securing means coupled to said posisitioning member and said second capacitor electrode, said positioning member including a top portion having a circular notch in the surface portion thereof in contact with the rotor assembly to thereby prevent breakage of the reinforcing plate at the portion thereof defining the position member receiving opening.

2. A variable capacitor as claimed in claim 1, and including a first resilient rotor lead coupled to said positioning member on the side of said stator supporting member away from said stator electrode, said rotor lead being adapted to provide a contact at the same elevation as the top portion of said positioning member, and a further stator lead, supported by said stator supporting plate and electrode, said stator lead defining a contact at substantially the same elevation as top portion of said positioning member.

3. A variable capacitor as claimed in claim 1, wherein said adhesive means for securing said first capacitor electrode and said supporting plate and said adhesive means for securing said dielectric layer, second capacitor electrode and reinforcing plate together includes sufficiently heated conductive plate.

4. A variable capacitor as claimed in claim 3 wherein said conductive paste comprises one of the group including palladium, silver and a combination thereof.

5. A variable capacitor as claimed in claim 1, wherein said reinforcing plate includes a cut-away portion formed therein, and electrically conductive securing means coupled to said positioning member and said second capacitor electrode through said cut-away portion so that said electrically conductive securing means is in contact with at least a portion of the reinforcing plate defining the cut-away portion to structurally secure the reinforcing element, second capacitor electrode, and positioning member together.

6. A variable capacitor as claimed in claim 5, wherein said electrically conductive securing means is soldered.

7. A variable capacitor as claimed in claim 6, wherein said cut-away portion is an arc-shaped cut-away region in the periphery of said reinforcing plate.

8. A variable capacitor as claimed in claim 6, wherein said cut-away portion is a notch in the periphery of said reinforcing plate.

9. A variable capacitor as claimed in claim 6, wherein said cut-away portion is an aperture in said reinforcing plate.

10. A variable capacitor comprising stator means including a supporting plate, first capacitor electrode, and an adhesive means for securing said first capacitor electrode to said stator supporting plate, rotor means including a positioning member rotatably mounted on said stator plate, said positioning member rotatably supporting a rotor assembly of uniform thickness for rotation therewith in friction contact with said stator means, said rotor assembly including a dielectric layer in friction engagement with said first electrode, a second capacitor electrode, and a reinforcing plate on the side of the dielectric having an opening therein for receiving said positioning member and a second electrode spaced from the first electrode for supporting said dielectric layer, said reinforcing plate having a lower dielectric constant than said dielectric layer, and an adhesive means for securing said dielectric layer, second capacitor electrode and reinforcing plate together, and electrically conductive securing means coupled to said positioning member and said second capacitor electrode, said positioning member including a top portion having a first annular groove along the side wall thereof, said groove being adapted to receive said conductive securing means therein, the top surface of said positioning member including a further groove facilitating further rotation of said positioning member, said top surface of said positioning member being devoid of said conductive securing means.

* * * * *